US011383831B1

(12) United States Patent
Atamanov (10) Patent No.: US 11,383,831 B1
(45) Date of Patent: Jul. 12, 2022

(54) METHODS OF VERTICAL TAKE-OFF/LANDING AND HORIZONTAL STRAIGHT FLIGHT OF AIRCRAFT AND AIRCRAFT FOR IMPLEMENTATION

(71) Applicant: HOVERSURF, INC., Wilmington, DE (US)

(72) Inventor: Aleksandr V. Atamanov, Saint Petersburg (RU)

(73) Assignee: Hoversurf, Inc., Wilmington, DE (US)

( * ) Notice: Subject to any disclaimer, the term of this patent is extended or adjusted under 35 U.S.C. 154(b) by 0 days.

(21) Appl. No.: 17/488,134

(22) Filed: Sep. 28, 2021

(30) Foreign Application Priority Data

Jun. 1, 2021 (RU) .......................... RU2021115694

(51) Int. Cl.
*B64C 29/00* (2006.01)
*B64C 11/46* (2006.01)
*B64D 27/24* (2006.01)

(52) U.S. Cl.
CPC .......... *B64C 29/0025* (2013.01); *B64C 11/46* (2013.01); *B64D 27/24* (2013.01)

(58) Field of Classification Search
CPC ..... B64C 29/0025; B64C 11/48; B64C 11/46; B64C 2027/8236; B64D 27/24; B64D 35/06
USPC .......................................................... 244/6
See application file for complete search history.

(56) References Cited

U.S. PATENT DOCUMENTS

| | | | | |
|---|---|---|---|---|
| 2,989,269 A | * | 6/1961 | Le Bel ................. | B64C 29/0033 244/12.3 |
| 4,828,203 A | * | 5/1989 | Clifton ................. | B64C 29/0025 244/12.3 |
| 6,732,972 B2 | * | 5/2004 | Malvestuto, Jr. ....... | B64C 23/08 244/12.3 |
| 8,181,903 B2 | * | 5/2012 | Posva ................. | B64C 29/0025 244/12.3 |

(Continued)

FOREIGN PATENT DOCUMENTS

| | | | | |
|---|---|---|---|---|
| CA | 2801651 C | * | 11/2015 | ............. B64C 27/22 |
| CN | 106585976 A | * | 4/2017 | |

(Continued)

OTHER PUBLICATIONS

U.S. Appl. No. 17/519,428; Non-Final Office Action dated Feb. 10, 2022; (16 pgs.).

*Primary Examiner* — Christopher P Ellis
(74) *Attorney, Agent, or Firm* — Fitch, Even, Tabin & Flannery LLP (57) ABSTRACT

Vertical take-off, landing and horizontal straight flight of an aircraft includes activation a plurality of front and rear lifting propellers, each of which is connected to a respective independently operating electric motor. In addition, horizontal straight flight of the aircraft includes activation of additional left and right pushing in-ring propellers, each of which is connected to an independently operating electric motor. The front and rear lifting propellers are respectively positioned generally horizontally and symmetrically opposite to one another and equidistantly relative to a longitudinal axis of the aircraft. The right pushing in-ring propeller and the left pushing in-ring propeller are positioned generally vertically and symmetrically opposite to one another and equidistantly relative to the longitudinal axis of the aircraft.

20 Claims, 4 Drawing Sheets

(56) References Cited

U.S. PATENT DOCUMENTS

| | | | |
|---|---|---|---|
| D665,333 S * | 8/2012 | Oliver | D12/326 |
| 11,072,421 B2 * | 7/2021 | Shi | B64C 27/56 |
| 2003/0062443 A1 * | 4/2003 | Wagner | B64C 29/0033 244/12.3 |
| 2004/0245374 A1 * | 12/2004 | Morgan | B64C 5/02 244/12.3 |
| 2006/0016929 A1 * | 1/2006 | Mohr | H02K 16/02 244/12.2 |
| 2006/0192046 A1 * | 8/2006 | Heath | B64D 35/04 244/12.3 |
| 2006/0231677 A1 * | 10/2006 | Zimet | A63H 27/12 244/17.23 |
| 2009/0159740 A1 * | 6/2009 | Brody | B64C 27/10 244/17.21 |
| 2012/0043413 A1 * | 2/2012 | Smith | B64C 29/0033 244/12.4 |
| 2013/0020429 A1 * | 1/2013 | Kroo | B64C 39/12 244/6 |
| 2014/0061366 A1 * | 3/2014 | Fink | B64C 39/04 244/6 |
| 2014/0097290 A1 * | 4/2014 | Leng | B64D 33/08 244/6 |
| 2015/0012154 A1 | 1/2015 | Senkel | |
| 2015/0344134 A1 * | 12/2015 | Cruz Ayoroa | B64C 39/12 244/48 |
| 2016/0236774 A1 * | 8/2016 | Niedzballa | B64D 27/24 |
| 2018/0140933 A1 | 5/2018 | Chen | |
| 2018/0354617 A1 * | 12/2018 | Frolov | B64C 29/0025 |
| 2019/0084684 A1 * | 3/2019 | Eller | B64D 27/24 |
| 2019/0106206 A1 * | 4/2019 | Shi | B64C 11/001 |
| 2019/0256200 A1 | 8/2019 | Neff | |
| 2020/0007825 A1 | 1/2020 | Jeong | |
| 2020/0140078 A1 * | 5/2020 | Lu | B64C 25/34 |
| 2020/0331590 A1 | 10/2020 | Yuksel | |
| 2021/0245872 A1 * | 8/2021 | Poh | B64C 5/02 |
| 2021/0300535 A1 * | 9/2021 | Petrov | B64C 39/062 |

FOREIGN PATENT DOCUMENTS

| | | | | |
|---|---|---|---|---|
| CN | 109018335 A | * | 12/2018 | B64C 29/0016 |
| CN | 110697035 A | | 1/2020 | |
| EP | 3670341 A1 | * | 6/2020 | B64C 11/001 |
| EP | 3771637 A1 | * | 2/2021 | B64C 25/04 |
| FR | 3092822 A1 | * | 8/2020 | B64D 27/24 |
| GB | 2423509 A | * | 8/2006 | B64C 29/0025 |
| GB | 2468917 A | * | 9/2010 | B64C 39/024 |
| GB | 2555439 A | * | 5/2018 | B64D 35/04 |
| GB | 2569659 A | * | 6/2019 | B64C 39/003 |
| JP | 2011255892 A | * | 12/2011 | |
| RU | 2629478 C2 | * | 8/2017 | |
| WO | WO-0047470 A2 | * | 8/2000 | B64C 29/00 |
| WO | WO-2005039972 A2 | * | 5/2005 | B64C 29/0025 |
| WO | WO-2005072233 A2 | * | 8/2005 | B64C 39/024 |
| WO | WO-2009069109 A2 | * | 6/2009 | B64C 39/066 |
| WO | WO-2009108178 A2 | * | 9/2009 | B64C 27/14 |
| WO | WO-2011140551 A1 | * | 11/2011 | B64C 29/0025 |
| WO | WO-2016028358 A2 | * | 2/2016 | B64C 29/0033 |
| WO | WO-2016181044 A1 | * | 11/2016 | B64C 3/38 |
| WO | WO-2017132515 A2 | * | 8/2017 | B64B 1/08 |
| WO | WO-2018208652 A1 | * | 11/2018 | B64C 29/0025 |
| WO | WO-2018209911 A1 | * | 11/2018 | B64C 3/56 |
| WO | WO-2019244892 A1 | * | 12/2019 | B64C 27/20 |
| WO | WO-2020105045 A1 | * | 5/2020 | B64C 39/04 |
| WO | WO-2020207862 A1 | * | 10/2020 | H02K 16/00 |

* cited by examiner

PRIOR ART

METHODS OF VERTICAL TAKE-OFF/LANDING AND HORIZONTAL STRAIGHT FLIGHT OF AIRCRAFT AND AIRCRAFT FOR IMPLEMENTATION

CROSS-REFERENCE TO RELATED APPLICATIONS

This Application Claims priority to Russian patent application no. 2021115694, filed Jun. 1, 2021.

TECHNICAL FIELD

The group of inventions described herein relates to aviation technology, namely, to aircraft capable of vertical take-off/landing and horizontal straight flight.

BACKGROUND

From the state of the art, the Multi-rotor Heavy Convento-rotorcraft is known (see Patent of the Russian Federation No. 2521121 for an invention, published on Jun. 27, 2014).

The Convento-rotorcraft is made in the form of the high-positioned monoplane, having rotors in rotary annular channels on the wing consoles, a fuselage with two power beams pivotally mounted in a diamond-shaped rocker plan, which has the possibility of deflecting its beams in the longitudinal plane and equipped with bearing rotors on pylons on its opposite tops. The rotors are connected by transmission shafts to the engines of the power plant mounted in the root part of the wing.

The Convento-rotorcraft has the tail unit with an all-movable stabilizer, the three-rack retractable wheel landing gear, the wing is made in the form of combination of two wings with the close location to each other, mounted by the ledge. The front wing is higher than the rear with the negative degradation of the first to the second in the angle of attack. The inter-gondola sections of the front and rear wings are equipped with the slat and flap and are mounted so that between the rear edge of the front wing and the front edge of the rear wing, which has 45% of the area of the front wing, there is a narrow gap equal to 2.5% of the chord of the front wing at the distance between the middle lines of the profile of the front and rear wings, equal to 30% of the chord of the rear wing.

The disadvantages of the known technical solution are: need to turn the movers; low handling and maneuverability; low safety of take-off, flight and landing of aircraft due to the lack of protection of the rotors from collisions with the ground surface and other obstacles; and large weight and size parameters (characteristics) of the aircraft.

From the state of the art, the method of flying in the air with the possibility of vertical take-off and landing is known (see Patent of the Russian Federation No. 2566177 for an invention, published on Oct. 20, 2015).

The flight method involves the creation of the air flow directed from top to bottom by coaxial movers with blades rotating in opposite directions. The blades have the ability to rotate around their longitudinal axis with the change of the angle of attack. By changing the rotation angles of the movers blades during each rotation, ensure the creation of the horizontal component of the thrust vector and the stabilization of the flight. Horizontal thrust in the steady-state horizontal flight mode is created by the jet mover. By turning the blades of the mover to the angle of attack of 0° in the mode of prolonged horizontal flight, the closed aerodynamic surface is formed—the rotating wing with the possibility of creating the climb power. The movers are connected to the engine through the gear drive system. The mover blades are connected to tilt system, gyroscope and control system.

The disadvantages of the known technical solution are: low reliability and controllability, since for horizontal flight there is one mover installed in the center; possibility of only horizontal straight flight; jet mover is used, which leads to the deterioration of maneuverability and environmental friendliness; low safety of take-off, flight and landing of the aircraft; and lack of protection of the rotors from collisions with the ground surface and other obstacles.

From the state of the art, the method of flight of aircraft and aircraft for its implementation are known (see International Publication of the Application WO2017198082 for an invention, published on May 8, 2017).

The disadvantages of the technical solution known from the state of the art are: need to change the horizontal position of the airframe for straight flight; need to use partially the thrust of the lifting movers to create the force pushing the aircraft forward; low safety of take-off, flight and landing of the aircraft; low flight speed; low flight comfort of the aircraft for passengers; low reliability.

An objective of the group of inventions described herein is to create a compact, safe aircraft during take-off/landing and flight with high maneuverability and controllability, as well as increased flight speed.

SUMMARY

The technical results of the group of inventions described herein include:
  reduction of energy costs for horizontal straight flight;
  increased flight stability and comfort;
  improved flight handling and maneuverability,
  improving environmental friendliness;
  reduced drag during horizontal straight flight;
  increasing the thrust and flight speed of the aircraft;
  increasing the safety of take-off, flight and landing of aircraft;
  increased fail-safety while maintaining the position of the aircraft in flight;
  ensuring the protection of the propellers from collisions with the ground surface and other obstacles during flight;
  increasing the compactness of the aircraft (reducing the overall dimensions of the aircraft);
  possibility to quickly identify and eliminate malfunctions (breakdowns) of electric motors and lifting bearing propellers (rotors);
  possibility of both horizontal straight flight and vertical take-off/landing.

The technical results of the group of inventions described herein are achieved by the fact that the aircraft for vertical take-off/landing and horizontal straight flight contains:
  lifting front and rear movers-bearing propellers (rotors) or groups of lifting front and rear movers-bearing propellers (rotors) for vertical take-off/landing, each of which is connected to an independently operating electric motor, the front and rear lifting propellers being installed in equal numbers, a certain distance from each other, at the front and rear of the aircraft relative to the direction of movement of the aircraft substantially in a horizontal plane parallel to the longitudinal axis of the aircraft, and being opposite and symmetrical relative to each other with respect to the longitudinal axis of the aircraft;

additional one or more auxiliary running (pushing) in-ring mover-propellers (impellers) for horizontal straight flight, each of which is connected to an independently operating electric motor, the right and left pushing in-ring propellers being installed a certain distance from each other substantially in a vertical plane perpendicular to the longitudinal axis of the aircraft, and being opposite and symmetrical relative to each other with respect to the longitudinal axis of the aircraft.

In various embodiments of the aircraft, independently operating electric motors of the running (pushing) propellers can be installed on one common load—bearing power platform—a frame in the form of a pipe and/or on two separate load-bearing power platforms—frames in the form of pipes perpendicular to the longitudinal axis of the aircraft, to the left and right of the side of the aircraft, while the blades of each propeller rotate around their horizontal axis.

In one embodiment of the aircraft, the running (pushing) propellers are installed closer to a middle than to opposite ends of the at least one common load-bearing frame and closer to a rear of the aircraft than to a front of the aircraft.

In another embodiment of the aircraft, the running (pushing) in-ring propellers are installed to the left and right of the aircraft side.

In another embodiment of the aircraft, the running (pushing) in-ring propellers can be installed in the center of the aircraft, to the left and right of the side of the aircraft, while the number of running (pushing) in-ring propellers can be any and the same to the left and right of the side of the aircraft.

In the embodiment of the aircraft, the independently operating electric motors of the front and rear lifting propellers are located interiorly relative to an external carriage frame such that the independently operating electric motors of the front and rear lifting propellers are visible from all sides of the aircraft and are accessible, while open bearing spatial (tubular) frames are made, for example, in the form of ellipsoid or parallelepiped, closed-end or open-end type, and the number of electric motors of lifting front and rear propellers (rotors) inside each open bearing spatial (tubular) frame is the same and can be any.

In the embodiment of the aircraft, independently operating electric motors of the lifting front and rear lifting propellers (rotors) are mounted on the load—bearing power platform—frame made of pipes that overlap, for example, form a cross.

In one embodiment of the aircraft, independently operating electric motors of the lifting front and rear lifting propellers (rotors) are installed on the upper and lower internal surfaces opposite and symmetrical relative to each other (parts) of the tubes of open load-bearing space frames facing each other, forming lifting rotor-motor groups (RMG), where coaxial pairs of front electric motors and rear electric motors are mounted to an inner surface of the external carriage frame such that each of front lifting propellers and the rear lifting propellers rotates about its vertical axis and does not contact the external carriage frame during rotation about the vertical axis, while the open bearing spatial frames—screens are installed on the bearing power platform—frame made of pipes.

In another embodiment of the aircraft, independently operating electric motors of the lifting front and rear lifting propellers (rotors) are installed perpendicular, top and bottom on the load-bearing power platform—frame made of pipes is opposite and symmetrical of relative to each other, forming lifting rotor-motor groups (RMG) having coaxial pairs of electric motors of the lifting propellers (rotors), while the lifting propellers (rotors) the coaxial pairs rotate parallel to each other around one vertical axis, are turned to the inner opposite and symmetrical surfaces (parts) of the tubes of the open bearing spatial (tubular) frame facing each other, and do not touch them, and each of front lifting propellers and each of the rear lifting propellers is separated from the inner surface of the external carriage frame only by an air gap.

In both embodiments of the aircraft, the number of coaxial pairs of independently operating electric motors of the lifting front and rear lifting propellers (rotors) is the same inside each open bearing spatial (tubular) frame and can be any depending on its size and volume, while the coaxial pairs inside each open bearing spatial (tubular) frame are located in the horizontal plane perpendicular to the longitudinal axis of the aircraft, and at the specified distance from each other.

In both embodiments, the number of open spatial (tubular) bearing frame with lifting RMG is the same in front and rear of the aircraft and can be any.

BRIEF DESCRIPTION OF THE DRAWINGS

The features and essence of the group of inventions described herein are explained in the following detailed description, illustrated by drawings (see FIGS. 1-6), where the following is shown.

The reference numbers in FIGS. 1-5 indicate the following features of the exemplary embodiments:
- 1—front movers—main front lifting or carrying rotors or propellers;
- 2—rear movers—main front lifting or carrying rotors or propellers;
- 3—additional (auxiliary) running (pushing) in-ring propellers installed in a horizontal plane on the left and right side of the aircraft, in the direction of movement of the aircraft;
- 4—open external carriage spatial (tubular) ellipsoid/parallelepiped carriage frame of a closed-end type;
- 5—a coaxial pair of independently operating electric motors;

6—a coaxial pair (front and rear) of lifting propellers (rotors);

7—load-bearing power platform—frame, located inside the open spatial (tubular) frame—screen for the installation of lifting front and rear propellers;

8—load-bearing power platform—frame for installing running (pushing) in-ring propellers, located perpendicular to the side of the aircraft;

9—load-bearing power platform—frame for installing lifting front and rear propellers;

10—internal surfaces (parts) of tubes of the open bearing spatial carriage frame that are opposite and symmetrical of relative to each other;

11 upper tube of the open load-bearing spatial carriage frame of the lifting RMG;

12—lower tube of the open load-bearing spatial carriage frame of the lifting RMG.

DETAILED DESCRIPTION

Figure 2:
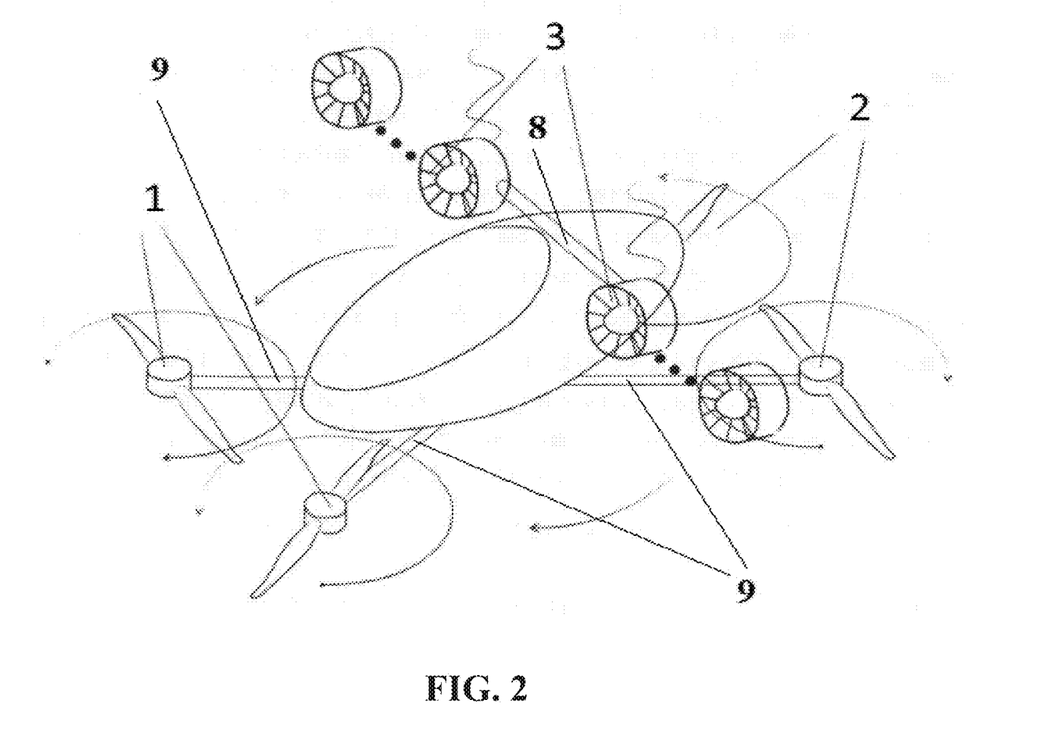
FIG. 2 shows an embodiment of an aircraft for vertical take-off/landing and horizontal straight flight with front and rear lifting propellers and additional auxiliary running (pushing) in-ring propellers.

FIG. 2 shows an embodiment of the claimed aircraft with two front 1 and two rear 2 lifting (carrying) propellers (rotors), respectively, and four additional auxiliary running (pushing) in-ring propellers (movers) 3 (two propellers on each side of the aircraft), respectively.

The front and rear lifting movers 1, 2, are installed in front and rear of the aircraft on the end sections of the pipes of the load—bearing power platform-carriage frame 9. The frame 9 is made of pipes that overlap, for example, form a cross.

The running (pushing) movers—in-ring propellers 3—blade machines enclosed in a circumferentially closed casing (body frame) can be installed on the sides of the aircraft (from the left and right sides of the aircraft) on one common bearing frame 8 in the form of pipe perpendicular to the longitudinal axis of the aircraft, or on two separate bearing frames in the form of pipes perpendicular to the longitudinal axis of the aircraft (not shown). The running (pushing) propellers 3 are installed generally vertically in such a way that the blades of the propellers 3 rotate around the horizontal axis.

The number of lifting bearing propellers (rotors) 1, 2 installed at the front and rear of the aircraft can be the same.

The number of installed running (pushing) in-ring propellers 3 can be the same on each side of the aircraft (for example, 2 propellers on each side).

The number of central running (pushing) in-ring propellers 3 can be equal to the number of side running (pushing) in-ring propellers 3 (for example, one propeller 3 can be installed in the center of the aircraft, one propeller 3 can be installed on the sides or differ from the number of side running (pushing) in-ring propellers 3 (for example, one propeller 3) in the center, two propellers 3 on the sides).

Each of the propellers 1, 2, 3 is connected to its own independently operating electric motor.

The blades of each propeller 3 rotate around its horizontal axis parallel to the longitudinal axis of the aircraft.

Each lifting front and rear lifting propeller (rotor) 1, 2, rotates around its vertical axis.

FIG. 2 shows one of the embodiments of the aircraft. Other embodiments of the aircraft are also possible, for example, with six running (pushing) in-ring propellers 3 (three each from the left and right sides of the aircraft), which does not change the essence of the invention.

Figure 3:
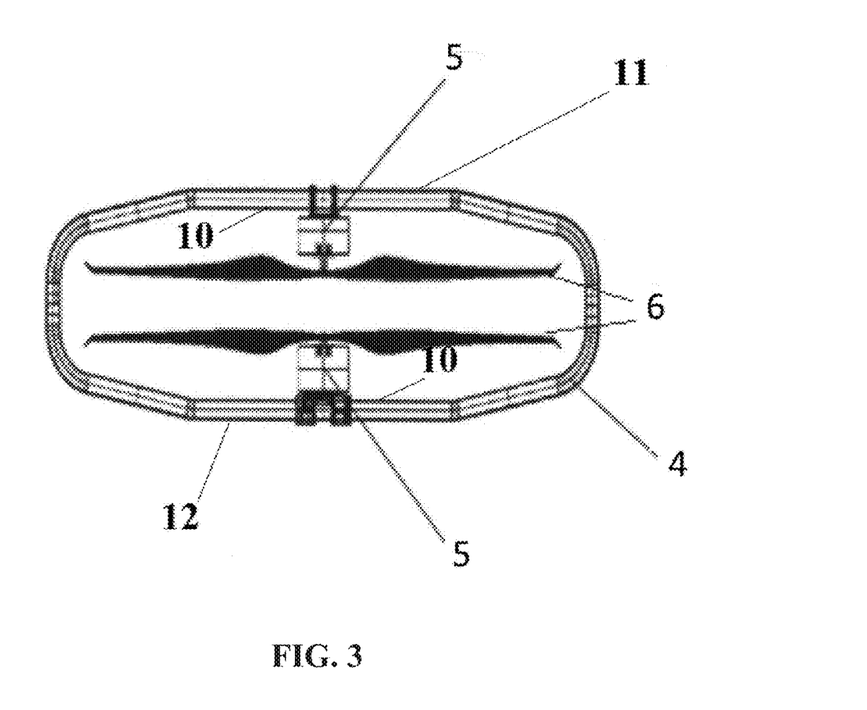
FIG. 3 shows a side view of an embodiment of an aircraft that includes a single coaxial pair of electric motors associated with a pair of lifting propellers (rotors), placed and fixed inside the load-bearing spatial tubular ellipsoid external carriage frame of the closed-end type.

FIG. 3 shows a side view of an embodiment of a lifting rotor-motor group (RMG) in the form of a single coaxial pair of electric motors 5 of the lifting propellers (rotors) 6, fixed inside the open bearing spatial (tubular) frame 4 in the form of ellipsoid.

Independently operating electric motors 5 of the lifting (front and rear) bearing propellers (rotors) 6 are fixed by their immovable foundation to the upper 11 and lower 12, relative to the load—bearing power platform-frame 7, 9, internal opposite and symmetrical surfaces (parts) 10 of the tubes of the open bearing spatial ellipsoid closed frame 4, facing each other, thus forming the lifting RMG having one coaxial pair of electric motors 5 bearing propellers (rotors) 6.

Independently operating electric motors 5 of lifting propellers (rotors) 6 are installed inside a load-bearing spatial tubular external carriage frame 4 in such a way that the lifting propellers (rotors) 6 do not come into contact with the frame 4, and the propellers (rotors) 6 and electric motors 5 are visible from all external sides and can be accessed. Each of the propellers 6 is connected to a respective independently operating electric motor 5.

The RMG are installed inside the carriage frame 4 in front and rear the aircraft, independently operating electric motors 5 of the lifting front and rear propellers (rotors) 1, 2, 6 are installed on the upper 11 and lower 12, relative to the load-bearing frame 7, 9, internal opposite and symmetrical surfaces (parts) 10 of the tubes of the open load-bearing spatial carriage frame 4 facing each other, thus forming the RMG having one coaxial pair of electric motors 5 and main propellers (rotors) 6, in this case, the bearing propellers (rotors) 6 of the coaxial pair rotate parallel to each other around one vertical axis, are turned to each other, and do not touch the load-bearing carriage frame 4 and only air is between the lifting propellers (rotors) 6 of the coaxial pair.

FIG. 3 shows one of the embodiments of the aircraft with one coaxial pair of electric motors 5 associated with lifting propellers (rotors) 6 installed inside one open spatial frame 4.

The number of coaxial pairs of electric motors 5 and lifting propellers (rotors) 6 inside one open spatial tubular frame 4 can be any, depending on its size and volume. When installing several coaxial pairs inside the frame 4, the coaxial pairs are located at a certain distance from each other, in the horizontal plane.

The number of frames 4 with the lifting RMG inside can be any at the front and at the rear of the aircraft, but their number is the same at the front and rear.

Figure 4:
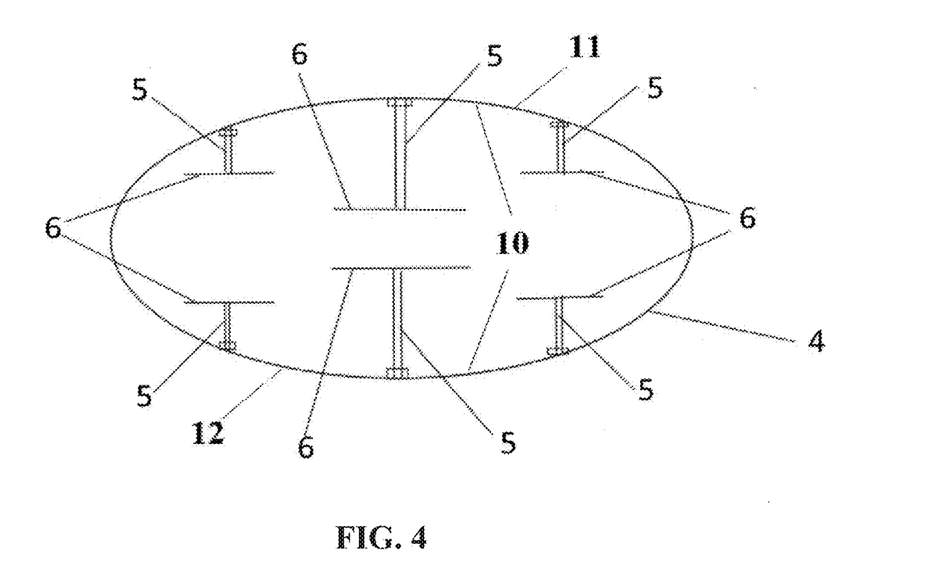
FIG. 4 shows a side view of an embodiment of the aircraft including three coaxial pairs of electric motors of lifting propellers (rotors), placed and fixed inside on the inner surfaces (parts) of the tubes of the load-bearing spatial tubular ellipsoid external carriage frame of the closed-end type.

FIG. 4 shows a side view of an embodiment of the lifting rotor-motor group (RMG) of the aircraft in the form of three coaxial pairs of electric motors 5 and lifting propellers (rotors) 6 fixed inside the load-bearing spatial (tubular) carriage frame 4 in the form of ellipsoid, closed type.

The RMG are installed inside the carriage frame 4 in front and rear the aircraft, independently operating electric motors 5 of the lifting front and rear bearing propellers (rotors) 1, 2, 6 are fixed with their immovable foundation on the upper 11 and lower 12 surfaces, relative to the longitudinal axis of the aircraft (or relative to the bearing frame 9), internal, facing each other, opposite and symmetrical of relative to each other internal surfaces (parts) 10 of the tubes of the open bearing spatial frame 4, thus forming the lifting rotor-motor group (RMG), having three coaxial pairs of electric motors 5 bearing propellers (rotors) 6 located at a certain distance from each other, while the lifting propellers (rotors)6 of the coaxial pair rotate parallel to each other around one vertical axis, are turned to each other, do not touch the open bearing space frame 4 and the lifting propellers (rotors)6 of the coaxial pair are spaced apart only by air.

In embodiments where electric motors 5 of the lifting propellers (rotors) 6 are attached to the inner surfaces (parts) 10 of the frame 4 shown in FIGS. 3 and 4, there is a gap of distance (from 5 cm) between the blades of the propellers (rotors) 6 of the coaxial pair, resulting from the strength and flexibility of the structure, to exclude the possibility of collisions during vibration, hard landing, turns, and other. On the centers of the propellers 6, on the sides facing each other, there are fixed Capralon™ cones protruding at the distance of 0.2 mm or more above the plane of the rotor 6, but not touching each other. This makes it possible not to damage the rotor blades 6 even in a critical situation, since any impact will be received by the cones.

FIG. 4 shows one of the embodiments of the aircraft with three coaxial pairs of electric motors 5 and lifting propellers (rotors) 6 installed inside one open spatial carriage frame 4 at the specified distance from each other. The number of coaxial pairs inside one open spatial tubular frame 4 can be any, depending on its size and volume.

Figure 5:
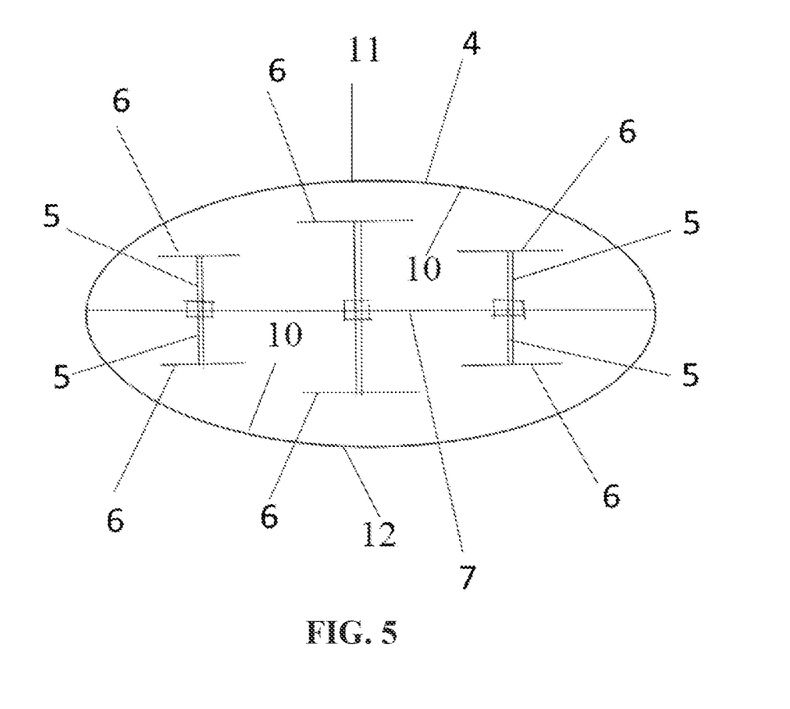
FIG. 5 shows a side view of an embodiment of the aircraft including three coaxial pairs of electric motors of lifting propellers (rotors), placed and fixed inside an open bearing spatial tubular ellipsoid external carriage frame of the closed-end type on the inner one supporting bearing power platform—frame.

FIG. 5 shows another embodiment of the lifting rotor-motor group (RMG) of the aircraft in the form of three coaxial pairs of electric motors 5 and lifting propellers (rotors) 6 fixed inside the open bearing spatial (tubular) carriage frame 4 in the form of ellipsoid at the certain distance from each other (side view).

Independently operating electric motors 5 of the lifting propellers (rotors) 6 are fixed by their immovable foundation perpendicular, above and below, relative to the longitudinal axis of the aircraft, on the load-bearing power platform—frame 7 located in the central part (in the middle) inside the open spatial tubular ellipsoid carriage frame 4, oppositely and symmetrically relative to each other, thus forming the lifting RMG having three coaxial pairs of electric motors 5 of the lifting propellers (rotors) 6 located at a certain distance from each other in the horizontal plane.

In this case, the bearing propellers (rotors) 6 of the coaxial pair are turned to the inner 10 upper 11 and lower 12, relative to the frame 7, 9, opposite and symmetrical surfaces (parts) 10 of the tubes of the open spatial ellipsoid carriage frame 4 and do not touch them, the bearing propellers (rotors) 6 of the coaxial pair rotate parallel to each other around one vertical axis and between the propellers (rotors) 6 of the coaxial pair and internal 10 facing each other, opposite and symmetrical relative to each other surfaces (parts) 10 of the tubes of the open spatial ellipsoid frame 4 there is only air.

FIG. 5 shows one of the embodiments of the lifting of RMG of the aircraft. The number of coaxial pairs inside one open spatial tubular frame 4 can be any, depending on its size and volume.

The open bearing spatial (tubular) frame (ref. no. 4, FIG. 3, 4, 5) is the system (space truss) of interconnected tubes made of high-strength materials/metals, for example, aluminum alloy, and performs the function of the screen completely covering the electric motors 5 and the bearing propellers (rotors) 6 from their external sides (surfaces, parts).

The open bearing spatial tubular carriage frame 4 can be made, for example, in the form of ellipsoid (see FIG. 3, 4, 5) or parallelepiped (not shown), both of a closed type (see FIG. 3, 4, 5) and open type (not shown).

The load-bearing power platform-frame 9 for lifting movers 6 is made of pipes that overlap, for example, form a cross.

In one embodiment, the electric motors 5 of the lifting bearing propellers (rotors) 6 are installed on the end sections of the frame pipes 9.

In another embodiment, the open spatial tubular carriage frames 4 are installed on the end sections of the pipes of the frame 4 (in the embodiment of the aircraft, when the electric motors 5 of the lifting propellers (rotors) 6 are fixed on the inner parts (surfaces) 10 of the upper 11 and lower 12 tubes of the frame 4).

The running (pushing) in-ring propellers 3 can be installed in the center and/or on the sides of the aircraft (from the left and right sides of the aircraft) on one common bearing frame 8 perpendicular to the longitudinal axis of the aircraft (see FIG. 2), or on different separate load-bearing power platforms.

One pushing (running) in-ring propeller 3 or several propellers 3 are installed in the central part of the aircraft side, closest to the rear side of the aircraft on the load-bearing power platform (not shown).

The number of pushing in-ring propellers 3 on the left and right, relative to the side of the aircraft, is the same and can be any.

When three pushing in-ring propellers 3 ape installed installing, for example, in the center, on the left side and right side of the aircraft, the pushing in-ring propellers 3 are located at a certain distance from each other, while the side pushing RMGs are equidistant from the central propeller 3.

The number of lifting bearing propellers (rotors) (pos. 1 and 2—FIG. 2) or lifting RMGs (see FIG. 3, 4, 5) at the front and rear of the aircraft are the same and can be any.

The number of coaxial pairs of electric motors 5 of lifting rotors 6 inside each frame 4—the screen in front and rear of the aircraft is the same and can be any depending on its size and volume.

The number of pushing in-ring propellers 3 in the central part of the aircraft may be the same or different from the number of pushing in-ring propellers 3 installed to the left and right of the aircraft side.

Figure 6:
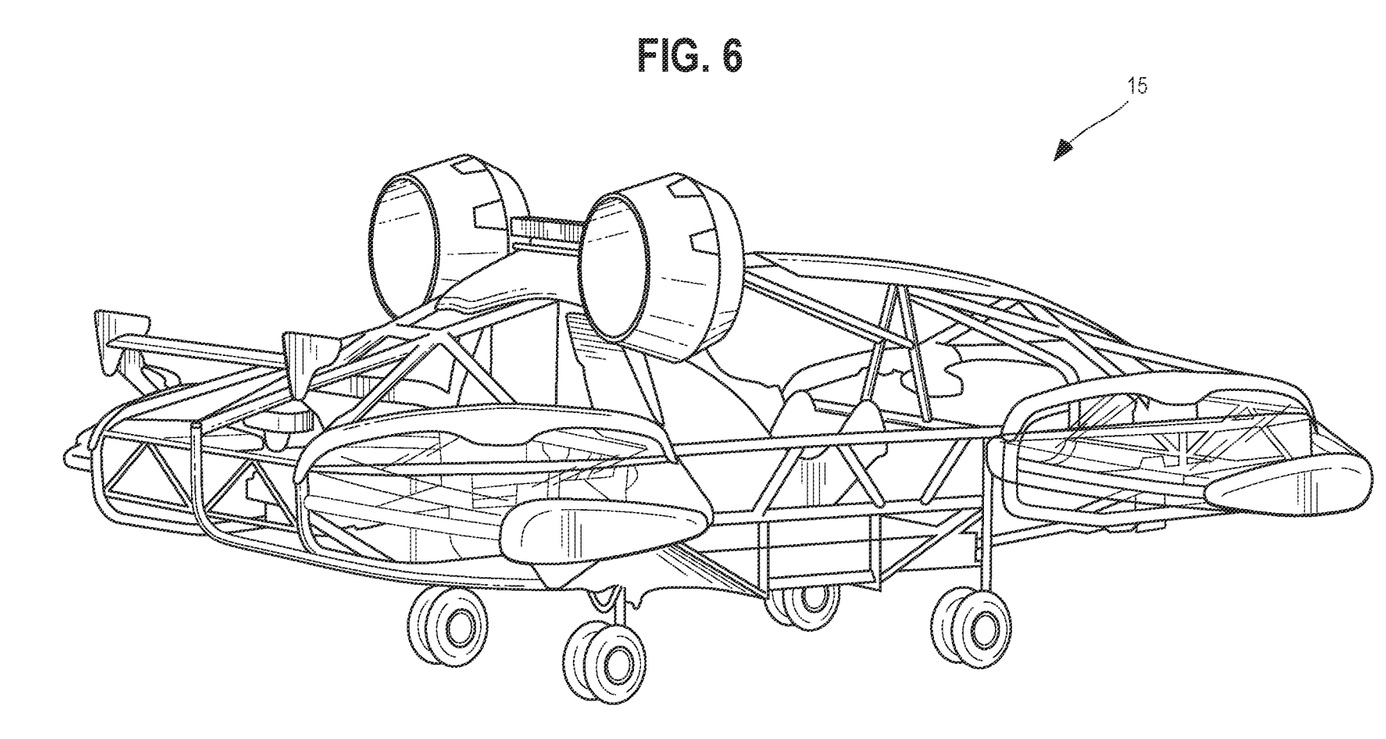
FIG. 6 shows an embodiment of a prototype of an aircraft for private use.

FIG. 6 shows an image of a prototype of an aircraft 15 with two front lifting and two rear lifting movers—bearing propellers (rotors) and two additional auxiliary undercarriage (pushing) movers—in-ring propellers.

Inside each of the four open bearing spatial tubular ellipsoid carriage frame 4 of the closed type, one coaxial pair of independently operating electric motors 5 of lifting bearing propellers (rotors)6 is installed, while independently operating electric motors 5 of the bearing propellers (rotors) 6 are fixed on the upper 11 and lower 12 inner 10 surfaces (parts) of the tubes of the frame 4, respectively.

Figure 1:
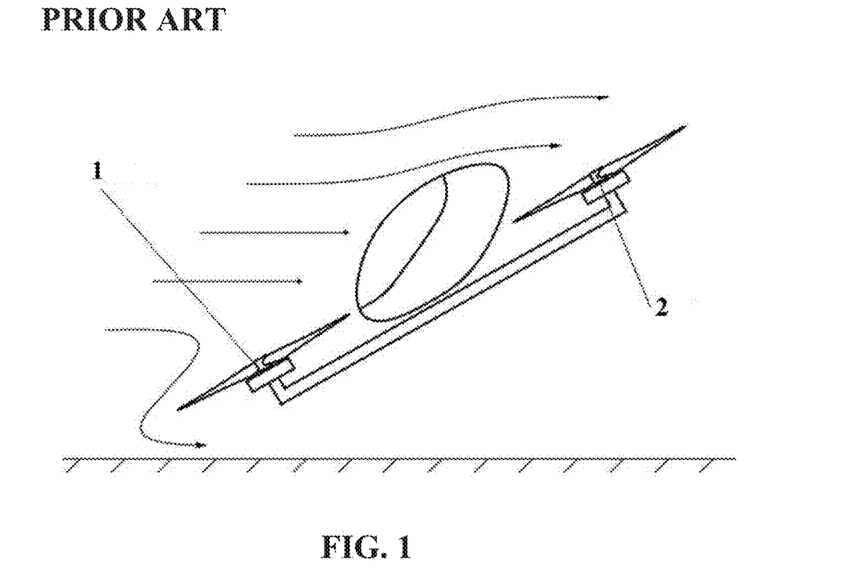
FIG. 1 shows a prior art aircraft with front and rear movers-propellers (rotors).

The aircraft known from the state of the art carry out the horizontal straight flight due to change in the pitch angle (the aircraft leans forward) (see FIG. 1). The angle changes by increasing the thrust on the rear movers 2, thereby changing the angle of the aircraft and the thrust vector appears that moves the aircraft forward.

In the aircraft described herein, to implement the method of horizontal straight movement, it is not necessary to change the pitch angle, the aircraft stays in the horizontal plane, thereby reducing the drag and increasing the flight speed of the aircraft. This is achieved by installing additional—auxiliary running (pushing) in-ring propellers 3 (see FIG. 2, 6).

Since the resulting vertical and horizontal thrust of the rear propellers 2 is not used for horizontal straight flight (see FIG. 1), and if the thrust of the additional auxiliary running (pushing) in-ring propeller(s) 3 is completely removed, then the energy costs for horizontal straight flight are reduced.

Improved controllability and maneuverability is achieved by changing the thrust on additional auxiliary running (pushing) in-ring propeller 3: for turning to the left, the thrust of the right horizontal running mover—propeller 3 or the thrust of the group of right running movers 3—propellers increases, and for turning to the right, the thrust of the left horizontal running mover—propeller 3 or the thrust of the group of left running movers—propellers 3 increases. Thus, there is the deviation of the aircraft on the course and the correction of the course.

Adjusting the rotation speed of the propellers (ref. nos. 1, 2, 3, 6—FIG. 2, 3, 4, 5)—bearing propellers (rotors) and/or propellers, each individually or all at the same time, with the help of independently operating electric motors 5, the aircraft can perform various actions (maneuvers) during flight (for example, turn, hover), as well as achieve the certain balance to ensure the stability and comfort of the flight.

Increasing the safety of take-off/landing and flight of aircraft, and ensuring the protection of propellers (rotors) 1, 2, 6 from collisions with the ground surface and other obstacles, are achieved due to the absence of open rotating blades of the front and rear propeller 1, 2, 6. For this purpose, in the embodiments of the invention, the lifting front 1, 6 and rear 2, 6 movers—bearing propellers (rotors) are installed and fixed inside open spatial tubular frames 4 that perform the function of screens of bearing propellers (rotors) 1, 2, 6.

In addition, the increase in the safety of take-off/landing and flight of aircraft is achieved by using in-ring propellers 3, i.e., blade machines enclosed in a closed complete ring (casing) with open inlet and outlet openings, as additional running (pushing) in-ring propellers instead of open rotors—propellers.

Increased fail-safety while maintaining the position of the aircraft in flight and flight safety are ensured through the use of coaxial pairs of independently operating electric motors 7 of lifting propellers (rotors) 8 and groups of pushing in-ring propellers 3 (at the expense of duplicating the RMG of the aircraft).

Increasing the environmental friendliness of the aircraft is achieved through the use of electric motors 5, rotors 6 and propellers 3.

Electric motors 5 and lifting propellers (rotors) 6 are installed inside the open frames 4 in such a way that they are visible from all external sides and there is access to them. This enables quick identification and elimination of various malfunctions (breakdowns) of electric motors 5 and lifting propellers (rotors) 6, repair and/or replacement.

The increase in the compactness of the aircraft (reduction of the area of the aircraft) is achieved by installing smaller propellers (rotors) 6 inside the open frames 4 in the form of coaxial pairs (see FIG. 3, 4, 5), instead of installing one separate propeller (rotor) 1, 2 of a larger size, as well as by installing smaller propellers 3 as an additional running (pushing) mover(s) instead of larger rotor blades (propellers).

The use of the pushing in-ring propeller(s) 3 as the additional auxiliary in-ring pushing running propellers allows to significantly increase the thrust and flight speed of the aircraft.

The aircraft described herein for the implementation of described flight method is compact, safe during take-off/landing and flight, and is made with the possibility of both horizontal straight-line flight and vertical take-off/landing, and has high maneuverability and controllability, as well as increased flight speed.

The analysis of the state of the art made it possible to establish: there are no analogs with the set of essential features that are identical and similar to the essential features of the group of inventions described herein, which indicates that the group of inventions described herein meets the "novelty" patentability condition. The results of the search for known solutions in order to identify essential features that coincide with the essential features of the group of inventions described herein that are distinctive from analogues showed that they do not explicitly follow from the state of the art, and the influence of the distinctive essential features on the technical results indicated by the authors has not been established. Therefore, the group of inventions described herein corresponds to the patentability condition "inventive level".

Despite the fact that the above-described group of inventions is described with reference to its certain embodiments, it will be clear to specialists in this field of technology that various changes in the form and content of the group of inventions described herein can be made in it without deviation from the essence and scope of the inventions described herein, which are determined by the attached claims, taking into account the description and drawings.

The invention claimed is:

1. A method of vertical take-off, landing and horizontal straight flight of an aircraft, the method comprising:
    performing a vertical take-off or landing of the aircraft by activating a plurality of front lifting propellers and a plurality of rear lifting propellers, each of the front lifting propellers and the rear lifting propellers being connected to a respective independently operating electric motor;
    wherein the front lifting propellers and the rear lifting propellers are present in equal numbers; and
    wherein the front lifting propellers are positioned generally horizontally and symmetrically opposite to one another and equidistantly relative to the longitudinal axis of the aircraft; and
    wherein the rear lifting propellers are positioned generally horizontally and symmetrically opposite to one another and equidistantly relative to the longitudinal axis of the aircraft;
    carrying out a horizontal straight flight of the aircraft by activating at least one right pushing in-ring propeller and at least one left pushing in-ring propeller, each of the at least one right pushing in-ring propeller and the at least one left pushing in-ring propeller being connected to a respective independently operating electric motor;
    wherein the front lifting propellers, the rear lifting propellers, the at least one right pushing in-ring propeller, and the at least one left pushing in-ring propeller are fixed in position, such that their respective axes of rotation are fixed and do not change when the aircraft transitions from the vertical take-off to the horizontal straight flight, thereby resulting in stable flight of the aircraft during said transition;
    wherein the at least one right pushing in-ring propeller and the at least one left pushing in-ring propeller are present in equal numbers; and
    wherein the at least one right pushing in-ring propeller and the at least one left pushing in-ring propeller are positioned generally vertically and symmetrically opposite to one another and equidistantly relative to the longitudinal axis of the aircraft.

2. The method of claim 1, wherein the independently operating electric motors of the at least one right and left pushing in-ring propellers are coupled to at least one common load-bearing frame oriented perpendicularly to the longitudinal axis of the aircraft, and wherein the at least one right and left pushing in-ring propellers rotate about a horizontal axis parallel to the longitudinal axis of the aircraft.

3. The method of claim 2, wherein the at least one right and left pushing in-ring propellers are positioned closer to a middle than to opposite ends of the at least one common load-bearing frame and closer to a rear of the aircraft than to a front of the aircraft.

4. The method of claim 1, wherein the independently operating electric motors of the front and rear lifting propellers are located interiorly relative to an external carriage frame such that the independently operating electric motors of the front and rear lifting propellers are visible and accessible from all sides of the aircraft.

5. The method of claim 4, wherein the external carriage frame is a closed-end tubular structure.

6. The method of claim 4, wherein the plurality of the front lifting propellers includes a pair of the front lifting propellers and wherein the plurality of the rear lifting propellers includes a pair of the rear lifting propellers, the pair of the front lifting propellers being coupled to a pair of independently operating front electric motors, and the pair of the rear lifting propellers being coupled to a pair of independently operating rear electric motors.

7. The method of claim 6, wherein the pair of the front electric motors and the pair of the rear electric motors are mounted to an inner surface of the external carriage frame, and wherein each of front lifting propellers and the rear lifting propellers rotates about a respective vertical axis and does not contact the external carriage frame during rotation about the respective vertical axis.

8. The method of claim 7, wherein each of the front lifting propellers and each of the rear lifting propellers is separated from the inner surface of the external carriage frame only by an air gap.

9. The method of claim 4, wherein the at least one right pushing in-ring propeller includes a pair of the right pushing in-ring propellers, and wherein the at least one left pushing in-ring propellers includes a pair of the left pushing in-ring propellers, the pair of the right pushing in-ring propellers being coupled to a pair of independently operating front electric motors, and the pair of the left pushing in-ring propellers being coupled to a pair of independently operating rear electric motors.

10. The method of claim 9, wherein the pair of the right pushing in-ring propellers are located above the external carriage frame, and the pair of the left pushing in-ring propellers are located above the external carriage frame, and wherein each of the right pushing in-ring propellers and the left pushing in-ring propellers rotates about a respective horizontal axis and does not contact the external carriage frame during rotation about the respective horizontal axis.

11. An aircraft for vertical take-off, landing and horizontal straight flight, the aircraft comprising:
a plurality of front lifting propellers and rear lifting propellers each configured to facilitate a vertical take-off or landing of the aircraft when activated, each of the front lifting propellers and the rear lifting propellers being connected to a respective independently operating electric motor;
at least one right pushing in-ring propeller and at least one left pushing in-ring propeller each configured to facilitate a horizontal straight flight of the aircraft when activated, each of the at least one right pushing in-ring propeller and the at least one left pushing in-ring propeller being connected to a respective independently operating electric motor;
wherein the front lifting propellers, the rear lifting propellers, the at least one right pushing in-ring propeller, and the at least one left pushing in-ring propeller are fixed in position, such that their respective axes of rotation are fixed and do not change when the aircraft transitions from the vertical take-off to the horizontal straight flight, thereby resulting in stable flight of the aircraft during said transition;
wherein the front lifting propellers and the rear lifting propellers are present in equal numbers;
wherein the front lifting propellers are positioned generally horizontally and symmetrically opposite to one another and equidistantly relative to the longitudinal axis of the aircraft;
wherein the rear lifting propellers are positioned generally horizontally and symmetrically opposite to one another and equidistantly relative to the longitudinal axis of the aircraft;
wherein the at least one right pushing in-ring propeller and the at least one left pushing in-ring propeller are present in equal numbers; and
wherein the at least one right pushing in-ring propeller and the at least one left pushing in-ring propeller are positioned generally vertically and symmetrically opposite to one another and equidistantly relative to the longitudinal axis of the aircraft.

12. The aircraft of claim 11, wherein the independently operating electric motors of the at least one right and left pushing in-ring propellers are coupled to at least one common load-bearing frame oriented perpendicularly to the longitudinal axis of the aircraft, and wherein the at least one right and left pushing in-ring propellers rotate about a horizontal axis parallel to the longitudinal axis of the aircraft.

13. The aircraft of claim 12, wherein the at least one right and left pushing in-ring propellers are positioned closer to a middle than to opposite ends of the at least one common load-bearing frame and closer to a rear of the aircraft than to a front of the aircraft.

14. The aircraft of claim 11, wherein the independently operating electric motors of the front and rear lifting propellers are located interiorly relative to an external carriage frame such that the independently operating electric motors of the front and rear lifting propellers are visible and accessible from all sides of the aircraft.

15. The aircraft of claim 14, wherein the external carriage frame is a closed-end tubular structure.

16. The aircraft of claim 14, wherein the plurality of the front lifting propellers includes a pair of the front lifting propellers and wherein the plurality of the rear lifting propellers includes a pair of the rear lifting propellers, the pair of the front lifting propellers being coupled to a pair of independently operating front electric motors, and the pair of the rear lifting propellers being coupled to a pair of independently operating rear electric motors.

17. The aircraft of claim 16, wherein the pair of the front electric motors and the pair of the rear electric motors are mounted to an inner surface of the external carriage frame, and wherein each of front lifting propellers and the rear lifting propellers rotates about a respective vertical axis and does not contact the external carriage frame during rotation about the respective vertical axis.

18. The aircraft of claim 17, wherein each of the front lifting propellers and each of the rear lifting propellers is separated from the inner surface of the external carriage frame only by an air gap.

19. The aircraft of claim 11, wherein the at least one right pushing in-ring propeller includes a pair of the right pushing in-ring propellers, and wherein the at least one left pushing in-ring propellers includes a pair of the left pushing in-ring propellers, the pair of the right pushing in-ring propellers being coupled to a pair of independently operating front electric motors, and the pair of the left pushing in-ring propellers being coupled to a pair of independently operating rear electric motors.

20. The aircraft of claim 14, wherein the pair of the right pushing in-ring propellers are located above the external carriage frame, and the pair of the left pushing in-ring propellers are located above the external carriage frame, and wherein each of the right pushing in-ring propellers and the left pushing in-ring propellers rotates about a respective horizontal axis and does not contact the external carriage frame during rotation about the respective horizontal axis.

* * * * *